3,085,073
PROCESS FOR THE PRODUCTION OF A HEAT
EXPANSIBLE THERMOPLASTIC RESIN
Josef M. Lintner, La Garenne-Colombes, France, and Herbert Petrovicki and Friedrich Schaffernak, both of Heidelberg, Germany, assignors of one-fourth to Karl Holl, Heidelberg, Germany
No Drawing. Filed Sept. 4, 1959, Ser. No. 838,058
Claims priority, application Germany Sept. 8, 1958
5 Claims. (Cl. 260—2.5)

This invention relates to the production of thermoplastic materials containing blowing agents. Thermoplastic materials which can be blown or expanded by heat are obtained inter alia by uniformly distributing in the materials low-boiling products, more especially low-boiling liquids having a boiling temperature lower than the softening point of the plastic. If the low-boiling liquid is soluble in the plastic, it can for example be incorporated in it by diffusion; on the other hand, if it is insoluble in the plastic, it can either by incorporated by kneading at elevated temperature and under pressure into the molten plastic or, if it is partially soluble, it can be incorporated by diffusion into the plastic at an elevated temperature and under pressure; moreover if the plastic is obtained by polymerisation of a monomer, a blowing agent which is insoluble in the plastic can be incorporated in the course of the polymerisation.

Liquids which are soluble in the plastic can be incorporated into the latter by diffusion without any special technical precautions, but when materials prepared in this way are expanded, products are obtained which have relatively large cells of irregular dimensions. The mechanical properties of these materials are usually not very satisfactory, and it is difficult by this method to produce materials having the very low densities required for most of the purposes for which such materials are used.

The incorporation into the plastic of liquids which are insoluble in the latter whether in the course of the polymerisation, by kneading, or by diffusion under heat and pressure, requires on the other hand considerable technical skill; however, when plastics containing blowing agents which are not solvents therefore are expanded, materials having very fine pores are obtained with a very low weight per unit of volume and with very good mechanical properties.

It has been found, and this forms one aspect of the present invention, that thermoplastic materials which contain a mixture of liquid blowing agents of boiling point below the softening temperature of the plastics of which one (hereinafter termed a "solvent blowing agent") is soluble in, and at least a strong swelling agent for, the plastic and the other (hereinafter termed a "non-solvent blowing agent") is insoluble in the plastic, the proportion of solvent blowing agent being less than 50%, and preferably less than 20%, of the total quantity of liquid blowing agent in the material, yield on blowing or expansion a very fine pored material of very low density and good mechanical properties while avoiding the disadvantages of the known processes. The two blowing agents are mutually miscible, in the sense of being at least partly soluble one in the other. In the blowing or expanding process, the solvent blowing agent facilitates and improves the plasticity and the adhesion or welding of the expanded plastic particles without any appearance of the disadvantages referred to above which are incurred when using only a blowing agent soluble in the plastic.

Furthermore according to the invention the above materials are produced by treating the plastic, advantageously in a finely divided form, for example in the form of a granulate, with a solvent blowing agent and also with a non-solvent blowing agent at a temperature which is lower than the boiling temperatures of either of the blowing agents, and then dissolving part of the solvent blowing agent out of the plastic. Thus, it is necessary to employ a larger quantity of the solvent blowing agent than the final product is to contain. Preferably the plastic is treated with a mixture comprising both the blowing agents.

By using the solvent blowing agent component during the diffusion process in excess over the amount finally required there can be obtained a rapid and uniform distribution of the non-solvent blowing agent in the plastic, even at temperatures of about 15–25° C. When the excess of solvent blowing agent is removed by washing the swelled plastic with a suitable solvent, the non-solvent blowing agent component is precipitated in the plastic.

This process can be used with any thermoplastic material, whatever its method of production and composition, provided that it is possible to find for this plastic, firstly a substance which is a solvent or softening agent for it at room temperature or moderately elevated temperature, and secondly a substance which is insoluble in the plastic but soluble in the solvent or swelling agent, the boiling temperatures of both substances being lower than the softening temperature of the plastic.

The solvent blowing agent is preferably used in such a diluted form that the plastic is only swelled but not dissolved when treated therewith; by this dilution of the solvent blowing agent its action on the plastic is delayed or moderated to such an extent that no excessive concentration can occur on the surface of the plastic grains, and the solvent blowing agent is given sufficient time to diffuse into the interior of the plastic to the extent to which it is taken up by the surface of the plastic. In this way, sticking of the individual plastic granules during the diffusion process is prevented. This dilution of the solvent blowing agent during the diffusion process can be achieved in various way: for example, the plastic granules can be treated with the vapour of the solvent at temperatures below its boiling temperature, or with the vapour diluted with an inert gas or with the vapour of the non-solvent blowing agent, or the treatment can be carried out in the vapour phase at reduced pressure. The solvent blowing agent when applied as a liquid can be diluted with a solvent which is neutral with respect to the plastic. It has proved to be especially desirable to treat the plastic with aqueous emulsions containing the blowing agents in the disperse phase; such emulsions are not only very easy and safe to handle, but there is also no danger in this case of agglutination of the plastic granules during the diffusion of the blowing agents thereinto and, with plastics containing plasticiser, no losses of plasticiser can occur during the diffusion process, even if the plasticiser is soluble in one of the blowing agents or in the blowing agent mixture.

As soon as the plastic is sufficiently swelled or softened by the solvent blowing agent, and in the swelled condition has absorbed a sufficient quantity of the non-solvent blowing agent (generally speaking, about 5–15%, calculated on the weight of plastic), the solvent blowing agent is partially dissolved out again. It is particularly desirable to use a solvent blowing agent which has a certain water-solubility, which may be low, and to use this agent in association with a non-solvent blowing agent which is insoluble in water, since in this case the partial removal of the solvent blowing agent can be readily and simply carried out with water. However, if such a combination is not possible, the excess of the solvent blowing agent can be removed by treating the swelled plastic with further non-solvent blowing agent. The washing can in general be considered as complete when the proportion of the solvent blowing agent still present in the material amounts to about 5 to 50% of the total quantity of the liquid blowing agents. The larger the total quantity of the non-solvent blowing agent introduced into the plastic, the lower should be the proportion of solvent blowing agent in the expandible plastic, and generally speaking it should not exceed 1–2% of the weight of the plastic.

Low molecular aliphatic hydrocarbons, such for example as butane, pentane, hexane and petroleum ether, have proved satisfactory as non-solvent blowing agents, which are also insoluble in water, in connection with most thermoplastic materials, and more especially with the so-called "benzine-resistant" types.

The solvent blowin agent must be selected with regard to the properties of the plastic being used; especially to be considered for this purpose are low molecular esters (e.g. methyl formate, methyl acetate and ethyl acetate), ethers (e.g. methyl and ethyl ethers, tetrahydrofuran), ketones (e.g. acetone, methyl ethyl ketone) and low-molecular chlorinated hydrocarbons (e.g. methylene chloride, chloroform, carbon tetrachloride, thichloroethylene). The quantity required in each case depends not only on the properties of the plastic, but also on its grain size; generally speaking, the larger the dimensions of the plastic granules, the greater are the quantities of solvent blowing agent required.

The equipment necessary for carrying out the present process is extremely simple. The incorporation of the blowing agents into the plastic granules by diffusion and the subsequent washing process are scarcely more complicated than the known "dry colouring" of plastic granulates, especially when the blowing agents are used in the liquid phase as aqueous emulsions. In such cases, with small or medium batches, it is advantageous to use a "roller vat," but with large batches, a closed stirrer-type vessel will be used. No heating or cooling means are required, since the operation is carried out at room temperature.

In contrast to the known processes, the present process enables the operator to incorporate into most thermoplastic materials with the simplest possible technical means blowing agents which are insoluble in the materials, this being done at the place where the materials are further processed. It is an advantage that the operator can always have available a fresh blowable material of uniform and established quality, which forms a material with extremely fine pores when it is expanded. Since a solvent blowing agent is present at the same time as the non-solvent blowing agent, the welding of the plastic granules during the expanding process is facilitated and improved, and this results in an improvement in the mechanical properties and in the steam-tightness of the expanded material. With viscous plastics, such as polyvinyl chloride and its copolymers, the welding of the individual particles during the expanding process is in any case only made possible by the presence of the solvent blowing agent, which acts as a temporary plasticiser during the expanding process.

The invention is illustrated in the following examples; it is to be noted that having regard to the differences existing between the different makes of the same type of plastic, the treatment times and concentrations in the examples can in certain cases be somewhat modified.

Example I 150 parts by weight of polystyrene, in the form of a granulate of about 2–3 mm., are treated in a roller vat with 300 parts by weight of an aqueous emulsion of 10 parts by volume of ethyl acetate and 10 parts by volume of petroleum ether (B.P.: 35–50° C.). After about 12 hours, 150 parts of the emulsion are extracted and 4 parts by volume of ethyl acetate and 6 parts by volume of petroleum ether are emulsified therein. This emulsion is again added to the polystyrene and the mixture is again treated for approximately another 12 hours in the roller vat. The same operation is repeated once again, using a mixture of 2 parts by volume of ethyl acetate and 8 parts by volume of petroleum ether. As soon as the plastic has in this way taken up about 10–12% of petroleum ether, the solvent emulsion is separated from the plastic and can be used for a fresh batch. As a result of this treatment, the plastic granules have assumed a spherical to lenticular shape and have a rubber-like character. They are now thoroughly washed with water and then stored in a container for several days in water, the water being replaced, either continuously or at intervals, until the content of ethyl acetate in the plastic is only about 1%. With the rinsing, the balls or lenticular elements again become brittle and have a milky to cloudy appearance due to the precipitation of the petroleum ether in the course of the washing. When stored in a moist condition in a closed container, the product maintains its blowing capacity without any change for a long period. By heating to about 75–100° C., the material can be blown or expanded to about 60 to 70 times its original volume.

Example II 150 parts by weight of polystyrene are treated as described in Example I with 300 parts by weight of an aqueous emulsion of 7 parts by volume of methylene chloride and 7 parts by volume of petroleum ether. This operation is again repeated twice, the proportion of methylene chloride being reduced with each subsequent addition. As soon as the content of petroleum ether in the polystyrene is about 10%, the diffusion process is stopped and the polystyrene is treated with water until its methylene chloride content is only about 1%.

The same process can also be used for polymethacrylic acid ester ("Plexiglas") and for cellulose triacetate containing plasticiser. When treating polyvinyl chloride, it is advisable to use dichloroethane instead of methylene chloride.

Example III

Granulated polymethacrylic acid ester ("Plexiglas") is treated in a roller vat with a solution of acetone in petroleum ether. The acetone concentration is so adjusted that the plastic granules swell but do not stick to one another, or at most do so only to an insignificant extent. As soon as the plastic swelled by the acetone has taken up about 10% of petroleum other, it is washed in running water.

It is also possible to proceed in the same way with acetone-soluble copolymers of vinyl chloride. In the case of cellulose triacetate, it is more advantageous to use a mixture of methyl formate and petroleum ether.

What we claim is:

1. A process for the production of a heat expansible thermoplastic synthetic resin in granular form, which comprises stirring a dispersion of thermoplastic synthetic resin grains in an aqueous emulsion of two mutually miscible, liquid blowing agents which have boiling points below the softening temperature of said synthetic resin, one of said blowing agents being soluble in said thermoplastic synthetic resin and the other one insoluble in the same, stirring being effected under substantially atmospheric pressure at a temperature below the boiling points of said blowing agents until said grains have retained from 5 to 15 percent by weight thereof of said insoluble blowing agent and a proportion by weight of soluble blowing agent between 2 and 15 percent; then separating said grains; and extracting said grains with a liquid solvent for said soluble blowing agent, which is a non-solvent for said insoluble blowing agent, to lower the proportion of said soluble blowing agent in said thermoplastic synthetic resin grains to below 2 percent by weight.

2. A process for the production of a heat expansible thermoplastic synthetic resin in granular form, which comprises stirring a dispersion of thermoplastic synthetic resin grains in an aqueous emulsion of two mutually miscible, liquid blowing agents which have boiling points below the softening temperature of said thermoplastic synthetic resin, one of said blowing agents being soluble in said thermoplastic synthetic resin and sparingly soluble in water while the other blowing agent is insoluble in said thermoplastic synthetic resin and insoluble in water, stirring being effected under substantially atmospheric pressure at a temperature below the boiling points of said blowing agents, until said grains have retained from 5 to 15 percent by weight thereof of said insoluble blowing agent and a proportion by weight of soluble blowing agent between 2 and 15 percent; separating said grains; and extracting said grains with water to lower the proportion of said soluble blowing agent in said thermoplastic synthetic resin grains to below 2 percent by weight.

3. In the process of incorporating into thermoplastic synthetic resin grains from 5 to 15 percent of their weight of a liquid blowing agent which has a boiling point below the softening temperature of said thermoplastic synthetic resin and is insoluble in said thermoplastic synthetic resin and a proportion between 2 and 15 percent by weight of a liquid vehicle for said liquid blowing agent, which is miscible therewith and is soluble in said thermoplastic synthetic resin, by causing a mixture of said blowing agent and said liquid vehicle to diffuse into said grains, the step of extracting the grains thus containing said blowing agent and said vehicle with a solvent for said vehicle which is a non-solvent for said blowing agent to lower the proportion of said vehicle in said grains to below 2 percent by weight.

4. A process for the production of a heat expansible thermoplastic synthetic resin in granular form, which comprises stirring a dispersion of thermoplastic synthetic resin grains in a mixture of a liquid blowing agent which has a boiling point below the softening temperature of said thermoplastic synthetic resin and is substantially insoluble in said thermoplastic synthetic resin, and a liquid vehicle for said liquid blowing agent which is miscible therewith and is soluble in said thermoplastic synthetic resin, stirring being effected under substantially atmospheric pressure at a temperature below the boiling point of said blowing agent until said grains have retained from 5 to 15 percent by weight thereof of said boiling agent and a proportion by weight of liquid vehicle between 2 and 15 percent; separating said grains; and extracting said grains with a solvent for said vehicle which is a non-solvent for said blowing agent to lower the proportion of said vehicle in said grains to below 2 percent by weight.

5. A process for the production of granular heat expansible polystyrene, which comprises stirring a dispersion of polystyrene grains in an aqueous emulsion of a liquid, lower aliphatic hydrocarbon blowing agent which is insoluble in polystyrene and in water and a polystyrene-soluble liquid blowing agent which is sparingly soluble in water, both blowing agents having boiling points below the softening temperature of polystyrene, stirring being effected under substantially atmospheric pressure and at a temperature of the range 15–25° C. until said grains have retained from 5 to 15 percent by weight thereof of said hydrocarbon blowing agent and between 2 and 15 percent by weight of said polystyrene-soluble blowing agent; then separating said grains; and extracting said grains with water to lower the proportion of said polystyrene-soluble blowing agent in said grains to below 2 percent by weight.

References Cited in the file of this patent

UNITED STATES PATENTS

| | | |
|---|---|---|
| 2,398,001 | Haney et al. | Apr. 9, 1946 |
| 2,418,211 | Williams | Apr. 1, 1947 |
| 2,744,291 | Stastny et al. | May 8, 1956 |